Sept. 21, 1965 W. W. PERKINS 3,207,979
MEASUREMENT OF INACCURACIES IN A SURFACE OF REVOLUTION
Filed Aug. 1, 1961

INVENTOR
WALLACE W. PERKINS
By Edward H. Goodrich.
HIS ATTORNEY

United States Patent Office 3,207,979
Patented Sept. 21, 1965

3,207,979
MEASUREMENT OF INACCURACIES IN A
SURFACE OF REVOLUTION
Wallace W. Perkins, West Hartford, Conn., assignor to General Motors Corporation, Detroit, Mich., a corporation of Delaware
Filed Aug. 1, 1961, Ser. No. 128,448
7 Claims. (Cl. 324—61)

This invention relates to the measurement of inaccuracies in a surface of revolution and particularly to a scanning mechanism which detects minute inaccuracies of contour in a spherical surface.

Balls as commonly used in precision ball bearings and particularly in ball bearings employed in delicate gauges and in guiding instruments such as gyroscopes used in long range missiles, must be finished to the utmost smoothness and accuracy of sphericity. It is not uncommon to require a spherical surface wherein this accuracy of contour lies within a tolerance of a few millionths of an inch. Also, the geometric center of such a precisely finished ball should coincide with its center of gravity. Even with the most accurate present grinding processes, minute surface errors occasionally occur in such ball surfaces. Consequently, even when such balls are ground to the utmost surface accuracies, it is important that the entire surface of each ball should be minutely inspected and accurately gauged before it is assembled into a precision ball bearing. Heretofore, this precision gauging has been impractically slow and expensive and most presently known gauges are incapable of measuring this extreme degree of precision. Mechanical measuring devices have been employed wherein a sensitive sharp gauge point is yieldably held against and sequentially moved over much of the surface of a ball. However, due to the fact that a ball has a very large surface area, this type of gauging is unsatisfactory and much too time-consuming to be practical since the ball has to be mounted for successive and precise rotation about a changing axis passing through the exact center of the ball.

It is, therefore, an object of my invention to provide an improved gauging and inspecting mechanism and method which will rapidly detect minute contour deviations in the surface of a precisely ground ball.

It is a further object of this invention to provide an improved gauging mechanism which rapidly and accurately indicates minute surface defects in a precisely ground ball and wherein there is no contact of a gauging element against the ball surface during a gauging operation.

It is a still further object of this invention to provide an improved electronic gauging mechanism and method which rapidly and accurately measures minute deviations from sphericity on a precisely ground ball surface and which indicates the extent of deviation from a predetermined radius of the ball over a small portion of its surface.

Figure 1:
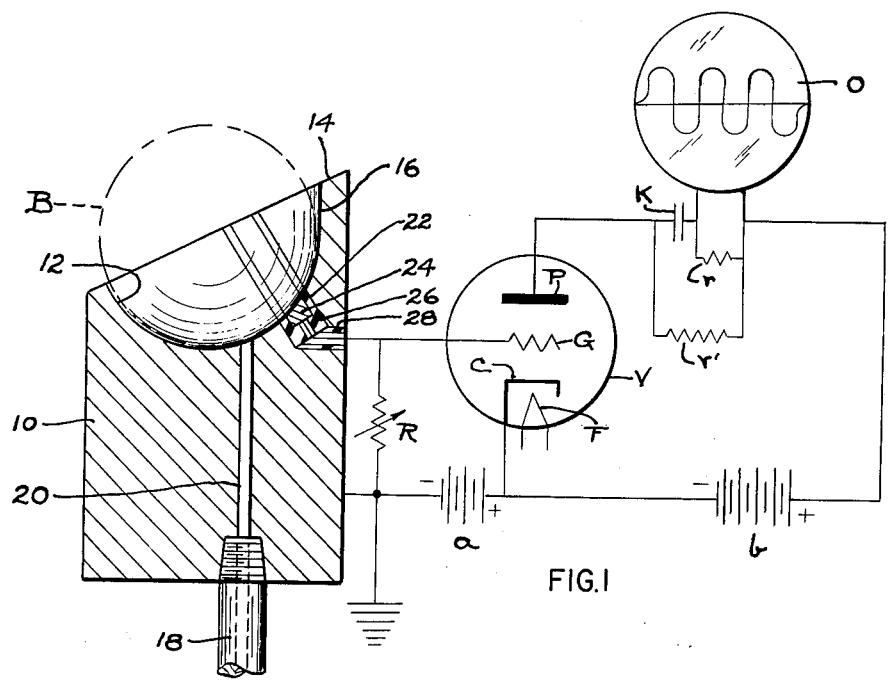
Figure 2:
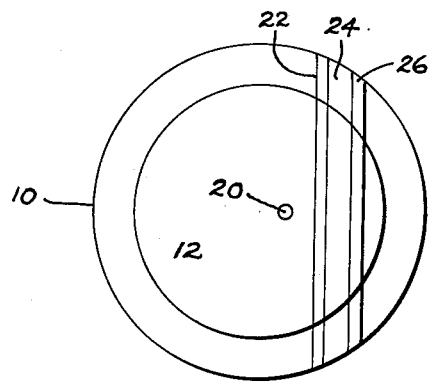

To these ends and to improve generally upon devices and methods of this character, this invention consists in the various matters hereinafter described and claimed. In its broader aspects, the invention is not necessarily limited to the specific arrangements selected for illustrative purposes in the accompanying drawings wherein FIGURE 1 diagrammatically illustrates my invention; and FIGURE 2 is a plan view of the gauging head.

My precision gauging mechanism is adapted to measure minute deviations from sphericity such as the measurement of errors in surface contour of a precisely ground metal ball B for use in a ball bearing. A suitably supported gauge head 10 has formed in its upper end a parti-spherical seat 12 having a curvature which closely conforms to that of the ball B to be gauged. This seat 12 has sufficient radial depth to nest a considerable portion of the ball being gauged and is herein illustrated as substantially hemi-spherical. The upper end of the head 10 is slabbed off at 14 and preferably lies in a plane angularly disposed to the generally vertical side walls of the head thus providing added area for the rear portion of the seat 12. The upper flat end face 14 on the head is shown at a forty-five degree angle to the side walls of the head, but may be at any suitable angle to provide the desired additional area at one side of the seat. As illustrated, the parti-spherical seat 12 blends at its rearward portion into a parti-cylindrical rear wall 16.

Suitable fluid as gas or air is fed under pressure through a pipe 18 into a vertical passage 20 whose upper end opens into the bottom of the seat 12 preferably at one side of the geometric center of the ball B during a gauging operation. This fluid under pressure provides a supporting layer of gas between the lower portion of the ball and the seat and uniformly supports the ball out of contact with the seat. Since the passage 20 is out of alignment with the ball center and since the seat 12 extends further about one side of the ball, the flow of fluid from the passage and between the ball and its seat causes the ball to rapidly spin out of contact with the seat and with the geometric center of the ball in fixed position with respect to the center of curvature of the seat. Preferably the radius of seat curvature is very close to that of the ball so that the ball will be supported on a uniform thickness of gas between the seat and the ball.

An arcuate groove 22 generally chordally disposed in the seat 12 at one side of the upper end of the passage 20 contains an arcuate electrode as a capacitor plate 24 held in position by an insulator 26 tightly secured as by bonding to the side and bottom walls of the groove. This groove is preferably located as near as practical to a diametrical plane of the ball passing through the seat. Also, this groove extends across the seat so that the capacitor plate 24 which arcuately and longitudinally extends through the length of the groove will form a narrow band extending preferably half away around the ball. The insulator 26 may be molded in position and insulates the capacitor plate 24 from direct electrical connection with the head 10 which may be grounded. If desired, this groove may be dovetail-shaped in cross section to more securely hold the insulating material in position. The accurately formed parti-spherical seat 12 is precisely ground with the insulator 26 and plate 24 mounted in the groove whereby the exposed surfaces of the insulator and plate will conform with and provide continuations of the parti-spherical seat surface.

An electrical conductor, extending through a bore in the head 10 and insulated from the head as by an insulator 28, connects the capacitance plate 24 to the grid G of an evacuated electron valve V having a cathode C heated by a filament F and provided with a plate P. The grid G controls the flow of electrons between the cathode C and the plate P. A grid bias battery $a$ has its negative terminal connected to the grounded head 10 and has its positive terminal connected to the cathode C. The positive terminal of battery $a$ is also connected to the negative terminal of a battery $b$ whose positive terminal is connected to one side of an identifying device such as an oscilliscope O. A capacitor K is located in series connection between the plate P and the other terminal of the oscilliscope O. A resistor $r$ is connected across the oscilliscope and a calibrating load resistor $r'$ is connected between the plate P and the positive terminal of battery $b$. An adjustable calibrating resistor R is connected between the grid G and the ground.

The metal balls to be tested are respectively placed in the seat 12. These balls may be manually positioned, or may be periodically and automatically fed sequentially into the seat. Also, if desired, the ball at the termination of each gauging operation may be ejected from the seat by a sudden blast of gas under increased pressure through the passage 20.

During each gauging operation, the metal ball B, within the seat 12, will be supported out of electrical contact with the seat by the intervening layer of gas between the ball and its seat. This gas will peripherally escape about the ball at the slabbed-off surface 14 at the top of the head 10. Due to the off-center position of the passage 20 with respect to the ball center, and due to the precise sphericity of contour of the seat 12, the ball B will normally rapidly rotate about its geometric center under the influence of its gas support. The metal ball B, seat 12, and the exposed arcuate surface of the capacitance plate 24, will cooperatively act as a capacitor in circuit with the grid G and the cathode C. The grid bias battery A produces a negative potential at the grid G which potential may be adjusted by the grid resistor R. The battery $b$ tends to create a flow of electrons from the heated cathode C to the plate P as indicated by the oscilloscope O or by any other suitable instrument as, for example, a vacuum tube volt meter. This electron flow will be automatically regulated by the negative potential of the grid G under control of the voltage in the capacitor provided by the surface of the rotating ball B, spherical seat 12, and arcuate capacitance plate 24. When the ball B is of accurate spherical contour with its geometric center located at its center of gravity, the thin insulating layer of fluid or gas between the seat and the ball provides a uniform spacing between the plate 24 and the adjacent rotating surface of the ball thereby resulting in a uniform voltage in the capacitor which maintains the grid G at a fixed negative potential. Under this condition, this negative potential does not change during rotation of the ball. The resistor R is adjusted or initially selected to preset the negative potential of the grid G to a voltage wherein the tracer line on the screen of the oscilloscope is in the form of a horizontal line when a ball of perfect sphericity and having its geometric center at its center of gravity is rotated by the insulating layer of fluid within the seat 12.

When a ball of the same size but having even minute surface imperfections is subsequently rotated in this seat 12, the change in distance between a surface deviation of the ball and the capacitor plate 24 during ball rotation produces a voltage change in the capacitance between the ball and the plate 24 resulting instantaneously in a change of the negative grid bias which is immediately indicated by the formation of a wave form of the tracer on the oscilloscope screen. A similar condition exists wherein an off-balance condition of the ball is caused by a noncoincidental relationship of the geometric center of the ball and the center of gravity of the ball. The oscilloscope screen may be graduated and the oscilloscope is preferably so adjusted that the amplitude of wave pattern indicated by the tracer directly indicates the deviation from true radius of the ball where there is even a minute deviation from true sphericity. If desired, suitable amplification may be provided between the electron valve V and the oscilloscope but this is not usually necessary. Since the arcuate length of the plate 24 extends substantially half way around the ball, it will be appreciated that each ball will be rapidly scanned and gauged for errors in sphericity.

I claim:

1. A gauging mechanism for a member having an electro-conductive surface of revolution of said member comprising a support having a curved seat for matingly receiving a portion of said surface of revolution, a capacitor electrode recessed in said seat and insulated from the support, said capacitor electrode having a curved surface coextensive with and forming part of the seat, means providing a flow of insulating fluid into the lower portion of the seat for supporting and rotating said member within and out of electrical contact with the seat, and electrical mechanism in circuit with the seat and said capacitor electrode and responsive to a change in capacitance between the rotating member and said capacitor electrode.

2. A gauging mechanism for a member having an electro-conductive surface of revolution of said member comprising a support having a curved seat for matingly receiving a portion of said surface of revolution, a capacitor electrode recessed in said seat and insulated therefrom, said capacitor electrode arcuately extending in the seat and having a curved surface coextensive with the seat surface, means providing a flow of gas under pressure into the bottom of the seat out of radial alignment with said surface of revolution, said gas forming a support which rotates the member in its seat out of electrical contact with the capacitor electrode, and electrical mechanism in circuit with the seat and said capacitor electrode which responds to changes in capacitance between the member and the capacitor electrode resulting from irregularities of contour in said surface of revolution.

3. A gauging mechanism for a metal member having a surface of revolution of said member comprising a support provided with a uniformly curved seat for matingly receiving a portion of said member, an insulator mounted in a recessed portion of the seat, an arcuate capacitor electrode mounted in the insulator and insulated from the support, said insulator and capacitor electrode having exposed portions forming continuations of and conforming with the curvature of the seat, means including a passage in the support for directing a flow of gas into the bottom of the seat and out of alignment with the center of seat curvature whereby the metal member will be supported and rotated on a layer of gas and out of engagement with the seat, and electrical mechanism in circuit with the seat and with the capacitor electrode which indicates out of round conditions on the metal member in response to changes in capacitance between the rotating metal member and said capacitor electrode.

4. A gauging mechanism for a metal ball comprising a support provided at its upper end with a parti-spherical seat for matingly receiving a portion of said ball, an insulator mounted in a recessed portion of the seat, a capacitor plate mounted in the insulator and insulated from said support, the capacitor plate longitudinally extending across the seat and having an exposed surface which is coextensive with the parti-spherical seat surface, the support having a longitudinal passage opening into the bottom of the seat and out of alignment with the center of the seat, means providing a flow of gas under pressure through the passage into the seat to support and rotate the ball about a fixed axis, and electrical measuring mechanism in circuit between the support and said capacitor plate which indicates non-conformities in the ball surface in response to capacitance changes between the ball surface and the capacitor.

5. A gauging mechanism for a metal ball comprising a support provided at its upper end with a parti-spherical seat for matingly receiving a portion of the ball, an insulator mounted in a groove arcuately extending across the seat, a narrow capacitor plate mounted in the insulator and longitudinally extending across the seat, said insulator and the plate having curved surfaces conforming with the seat curvature and forming a part of said seat, the support having an upwardly extending passage opening into the bottom of the seat out of radial alignment with the seat, means providing a flow of gas under pressure through the passage to support and rotate the ball in the seat and out of contact with the surface of the seat, and electrical measuring mechanism including an electron valve having a balanced grid circuit including the capacitor plate and said support, said valve responding to minute changes in capacitance between the ball surface and the capacitor plate resulting from a change in ball contour with reference to the capacitor plate.

6. A gauging mechanism for a metal ball comprising a support provided at its upper end with a parti-spherical seat for matingly receiving a portion of the ball, the support having a parti-cylindrical wall blending with and extending upwardly from a portion of the seat, a narrow capacitor plate mounted in a recessed portion of the seat and arcuately extending across the width of the seat, an insulator electrically insulating the plate from the support, the insulator and plate having curved exposed surfaces conforming with the seat curvature and forming an intermediate portion of the seat, means providing a flow of gas under pressure into the bottom of the seat and offset from alignment with the center of the ball in said seat to support and rotate the ball in the seat about a fixed axis on a layer of gas between the ball and seat which locates the ball out of seat engagement, and electrical measuring mechanism which measures changes in capacity between the ball surface and the capacitor plate resulting from minute changes in ball surface contour with respect to the capacitor plate.

7. A gauging mechanism for a metal ball comprising a support provided at its upper end with a parti-spherical seat for matingly receiving a portion of the ball, a narrow capacitor plate mounted in a recessed portion of the seat and arcuately extending across the seat near a diametrical portion of the seat, an insulator electrically insulating the plate from the support, the insulator and plate having exposed curved surfaces conforming with the seat curvature and forming an intermediate portion of the seat, means providing a flow of gas under pressure into the bottom of the seat and out of alignment with the center of the ball in the seat to support the ball on a layer of gas which rotates the ball about a fixed axis and out of seat engagement, an electron valve having a balanced grid circuit responsive to changes in capacitance between the moving ball surface and the capacitor plate resulting from a minute change in spacing between the ball and plate due to non-conformities of the ball surface, and measuring means responsive to the electron valve.

References Cited by the Examiner
UNITED STATES PATENTS

| | | | |
|---|---|---|---|
| 2,353,150 | 7/44 | Dietz | 73—472 |
| 2,602,838 | 7/52 | De Boisblanc et al. | 324—61 |
| 2,892,152 | 6/59 | Buisson | 73—465 |
| 2,946,224 | 7/60 | Yamaguchi | 73—461 |

FOREIGN PATENTS

| | | |
|---|---|---|
| 864,014 | 3/61 | Great Britain. |
| 871,147 | 6/61 | Great Britain. |
| 318,217 | 2/57 | Switzerland. |

WALTER L. CARLSON, *Primary Examiner.*

ROBERT EVANS, *Examiner.*